(No Model.) 2 Sheets—Sheet 1.
J. T. BRENEMAN.
WAVE AND STREAM MOTOR.
No. 596,801. Patented Jan. 4, 1898.
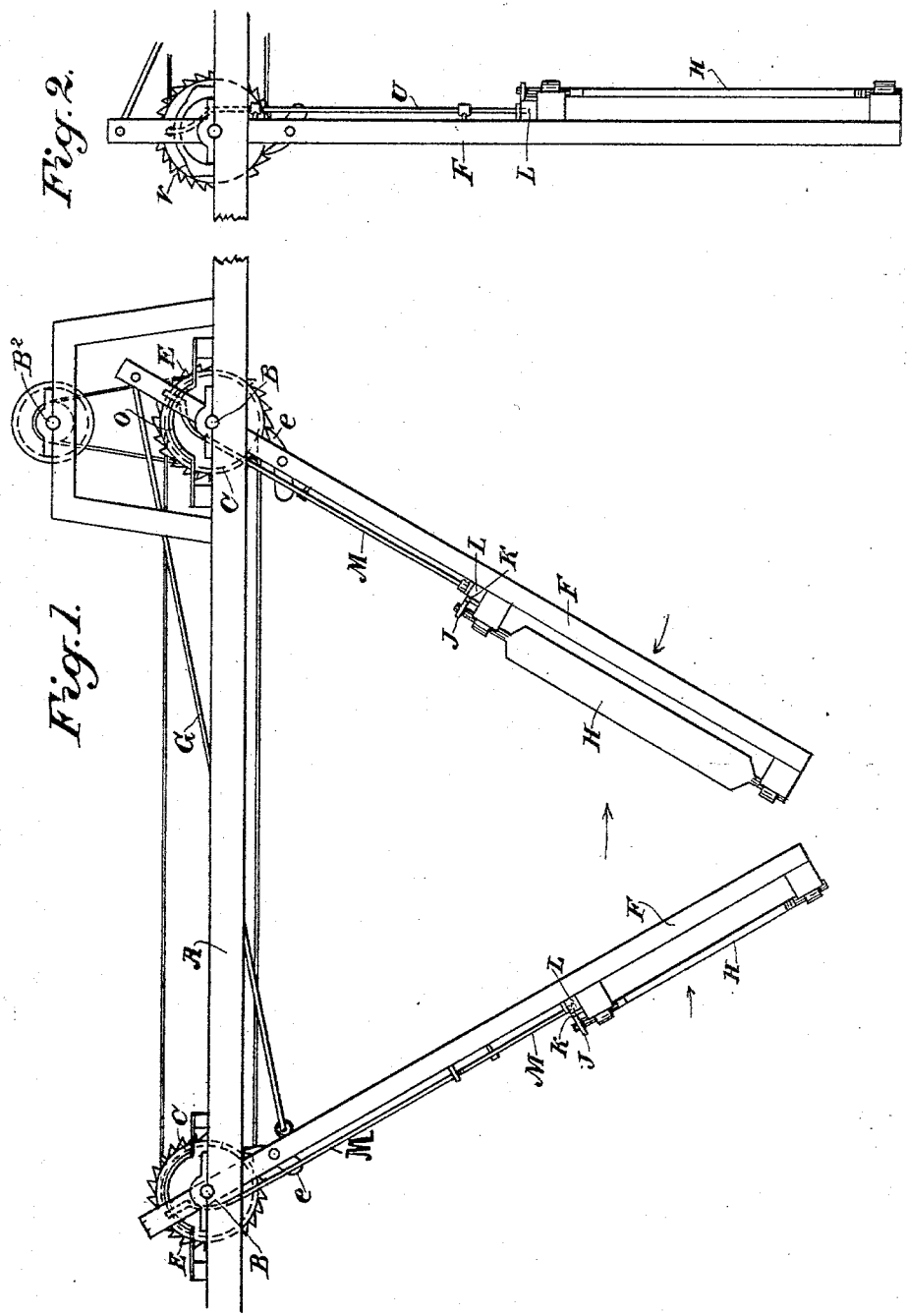
Witnesses,
J. H. Nurse
H. F. Ascheck
Inventor
Joseph T. Breneman
By Dewey & Co.
Attys

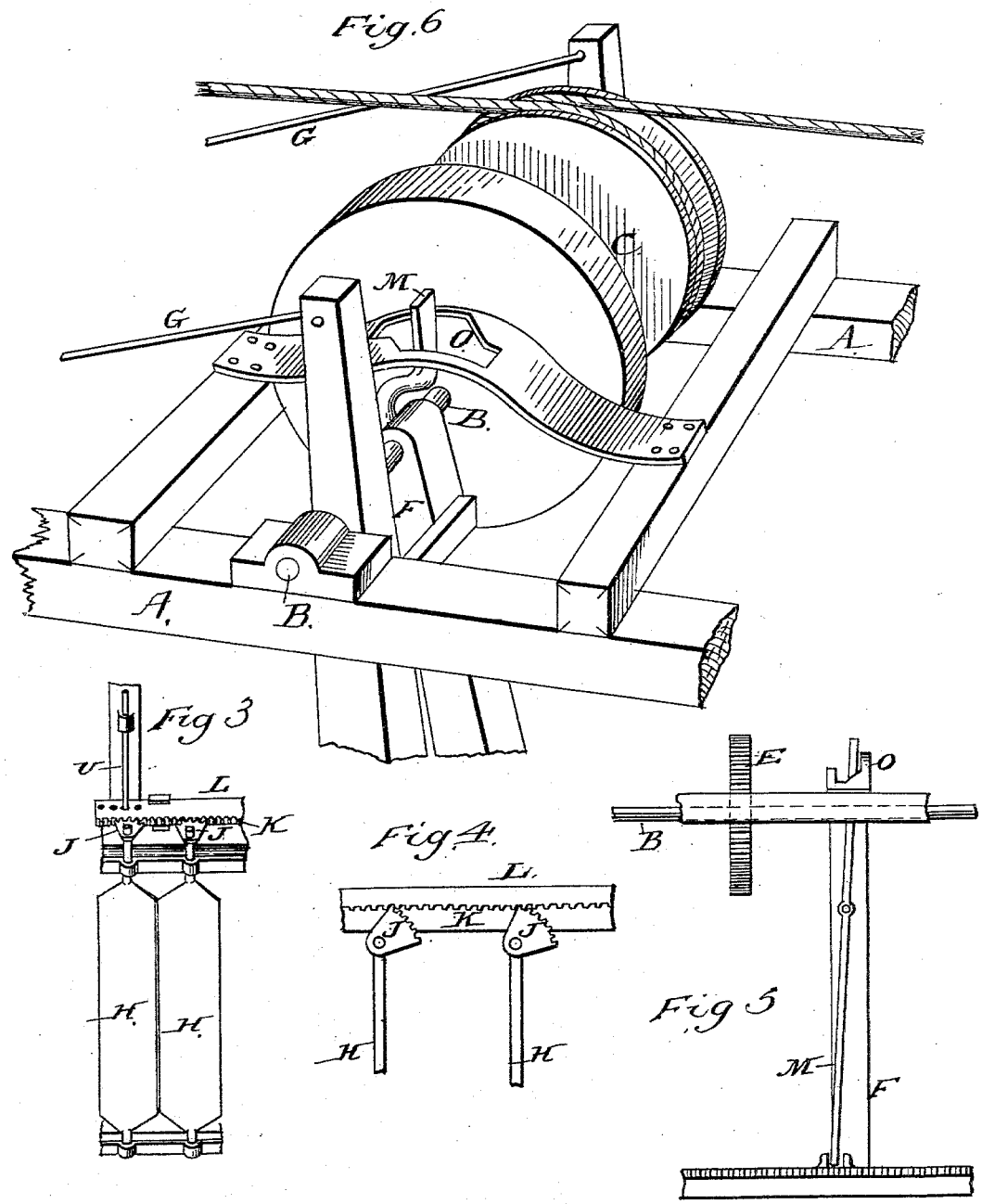

UNITED STATES PATENT OFFICE.

JOSEPH T. BRENEMAN, OF WALNUT CREEK, CALIFORNIA.

WAVE AND STREAM MOTOR.

SPECIFICATION forming part of Letters Patent No. 596,801, dated January 4, 1898.

Application filed April 24, 1896. Serial No. 588,867. (No model.)

*To all whom it may concern:*

Be it known that I, JOSEPH T. BRENEMAN, a citizen of the United States, residing at Walnut Creek, county of Contra Costa, State of California, have invented an Improvement in Wave and Stream Motors; and I hereby declare the following to be a full, clear, and exact description of the same.

My invention relates to a device for producing power, which I call a "wave and stream motor."

It consists in the parts and the constructions and combinations of parts which I shall hereinafter fully describe and claim.

Figure 1 is a side elevation of my device. Fig. 2 is a view of the opposite side of a gate, showing the locking device. Fig. 3 is a detail showing two of the floats and their adjuncts. Fig. 4 is a detail of the device to turn the floats. Fig. 5 is a front view of the device for turning the gates by means of a slotted plate. Fig. 6 is an enlarged detail to be hereinafter referred to.

My apparatus is mounted upon a frame or structure of any suitable form, depending upon the position of the apparatus and convenience in locating it. This structure in the present case is represented by an elongated framework A, which may be supported by fixed piling, or it may be anchored permanently in the stream or tide way. Across this stream extend shafts B, which are suitably journaled in boxes at either end. Upon these shafts are mounted wheels c, through which power may be transmitted.

In the present case I have shown a series of two shafts, the wheels of which are connected together and from which power is transmitted to a drum or pulley upon the shaft B². From this any arrangement of gears, pulleys, or other transmitting device may be arranged to increase or decrease the speed according to the work which is to be performed. Upon each of these shafts is fixed a ratchet-wheel E, and these ratchets are engaged by pawls e upon swinging gates F. These gates are suspended loosely upon the shafts B, previously described, so that they may oscillate back and forth upon these shafts.
When the gates swing in one direction, the pawls will move over the ratchet-teeth, and when they swing in the opposite direction they will engage these teeth so as to rotate the shaft and the connected pulleys. The gates are so arranged that when more than one is employed they are connected together in pairs in any manner which will cause them to oscillate in opposite directions. In the present case I have shown them as connected by rods G, which connect with one swinging gate above its supporting-shaft B and with the other below its shaft, so that the two will operate in unison. It will be manifest that any number of these gates may be connected together in pairs to operate in the same manner. In order to oscillate these gates alternately with and against the tide or current by which they are impelled, I have shown a series of floats H, journaled upon each of the gates, so that they lie below the surface of the water. These floats are in the present case shown journaled vertically, and they may be turned to stand edgewise to the passing stream or tide, or they may be turned flatwise, so that the current will take effect upon them. When they are turned to present their flat sides to the current, it will be manifest that the tide or current will cause the gate upon which the floats are thus presented to be moved by the current. The other gate which forms one of the pair will have its floats turned edgewise at the same time, so that while the first float is being moved in the direction of the current the second will be correspondingly moved against the current by reason of its not presenting any large surface to the action of the current. The position of these floats is alternately changed, so that when the first gate has reached the end of its stroke its float will be turned edgewise, while the floats of the other gate will be turned to present their flat surfaces, when the reverse operation takes place, the second gate being impelled by the current and the first returning against it.

Various devices may be employed for changing the position of the floats upon the gates.

In the present case I have shown the upper ends of the shafts or pivots of the floats provided with segmental gears J. These engage with rack-sections K, fixed upon the transversely-movable slide L. This slide is moved by a lever M, pivoted upon the main frame, so as to be alternately turned from side to side by a mechanism connected with the frame. I have shown the upper end of the lever extending into a cam-shaped slot O, formed in a fixed circular segment concentric with the shaft B, as shown in Fig. 6. As the gate swings in one direction the upper end of the pivoted connecting-rod M will strike the inclined cam as the gate reaches the end of its stroke, which will cause it to swing to one side, thus operating the sliding rack-bar and changing the position of the floats. When the gate has swung to the opposite end of its stroke, the lever M will be acted upon by the opposite end of the cam and moved in the opposite direction. The floats will thus be turned so as to present their broad surfaces to the tide or current when the gate has moved to its greatest distance toward the flowing current, and will be turned so as to present the edges when it has been carried by the current to the end of its stroke in the opposite direction.

In order to prevent the floats from being turned before the end of the stroke in either direction, I have shown a lock which consists of a vertically-movable rod extending down alongside the swinging gate and adapted to enter holes in the transversely-sliding rack-bar. When the rack-bar has been moved in one direction, so that the floats stand with their broad faces presented to the current, this rod will enter a hole or act to latch the rack-bar and thus retain the floats in their position while the gate is swinging through its arc to the end of the stroke. Just previous to reaching the end of the stroke the rod U will be lifted by reason of its end passing over a fixed cam-plate V, which will momentarily unlatch the sliding rack-bar and allow it to be shifted so as to present the edge of the floats. As soon as this is done and just as the gate commences its return movement this rod or latch again engages the rack-bar and prevents its motion until the movement in the opposite direction has been completed.

It will be seen by this construction that each pair of swinging gates alternately swing toward each other and then away from each other, and while one of these swinging gates is applying its power through the pawl-and-ratchet mechanism to propel the pulleys the pawl of the other will be moving over its ratchet-wheel without action, but the instant the other gate commences to move the pawl will engage its ratchet-wheel and act upon it to continue the rotation of the drum, and the movement thus communicated from a pair of these gates will be very nearly continuous. By adding other pairs of gates which alternate with the first pair it will be seen that a continuous motion may be produced, and this may be transmitted to actuate a dynamo or other means through which power can be utilized.

This apparatus may be fixed at any point where there is a tideway or where there is a constant and steady movement of the waves which would cause these gates to oscillate, and it is especially applicable to the rapidly-flowing currents of rivers where the apparatus may be anchored or fixed at any convenient or desired point, the power produced from it being easily transmitted to a point where it can be utilized.

Having thus described my invention, what I claim as new, and desire to secure by Letters Patent, is—

1. The combination, of swinging suspended gates, the lower ends of which dip beneath the surface of a flowing current, a connection extending from one gate at a point above its fulcrum to the other gate at a point below its fulcrum, whereby the gates are connected in pairs and are adapted to oscillate to and from each other, floats journaled upon said gates beneath the surface of the water and turnable so as to alternately present flat surfaces to the action of the current and the edges when the floats are to return against the current, a mechanism by which the alternate reversal of the floats is simultaneously effected, and locking devices to hold the floats in position while a stroke is completed in either direction.

2. The combination, of swinging suspended gates, the lower ends of which dip beneath the surface of a flowing current, a rod or connection between the gates, connected at one end to one of the gates at a point above the fulcrum thereof and connected at its opposite end to the other gate at a point below its fulcrum whereby the gates are connected in pairs and oscillate to and from each other, floats journaled upon said gates beneath the surface of the water, and turnable so as to alternately present their flat surfaces and edges to the current, toothed segments fixed upon the pivot-pins of the floats and horizontally-slidable racks engaging said segments, lever-arms engaging the racks and a cam mechanism whereby the lever-arms are alternately shifted from one side to the other whereby the faces of the floats are presented to be acted on by the current so as to swing the gates about their points of suspension until they reach the end of their arc of motion, when the lever is reversed and the edges of the floats presented so that they may be returned against the current.

3. In a wave or stream motor, the combination, of vertically-disposed gates connected together in pairs and adapted to oscillate to and from each other, the lower ends dipping beneath the surface of the flowing current, a rod extending from a point above the fulcrum of one gate to a point below the fulcrum of the companion gate, floats pivoted upon the gates beneath the surface of the water and turnable so as to alternately present their flat faces to be acted upon by the current so as to swing the gate about its point of suspension, and their edges to allow the gate to be returned, a mechanism by which the floats are turned and connections between each pair of frames whereby one gate will have its floats acted upon by the current, while the other will be returned against the current.

4. In a wave and stream motor, the combination, of vertically-suspended gates fulcrumed at points intermediate of their ends, a rod extending from a point above the fulcrum of one gate to a point below the fulcrum of the companion gate whereby said gates are connected together in pairs so as to alternately swing to and from each other, floats pivoted upon the lower ends of the gates and beneath the surface of a flowing current or stream, mechanism by which said floats are turnable together so as to alternately present their flat faces for the action of the current, and their edges when the gates are returned against the current, the mechanism of each of the floats being operated in the opposite direction to its fellow, so that one of the floats will present the edges to return against the current, while the other float presents the face to be acted upon by the current, and a latching device whereby each of the floats is retained in its position until the arc of motion of the gate is completed in either direction.

5. In a wave or stream motor, the combination of suspended swinging gates connected together in pairs so as to oscillate to and from each other, floats pivoted upon the lower ends of the gates and submerged beneath the flowing current, toothed pinions fixed to the pivot-pins of the floats, and racks engaged thereby, and a mechanism by which they are caused to slide transversely so as to present the flat side of one set of floats to be acted upon by the stream, and the edges of the other set of floats to return against the stream or current, a latching-rod for each adapted to engage the sliding rack and hold it in its position during the movement of the gate from one end of the stroke to the other, and a cam by which the latch is disengaged to allow the reversal in the position of the floats and again engaged after the floats have been reversed so as to hold the rack while the return stroke of the gate is being repeated.

In witness whereof I have hereunto set my hand.

JOSEPH T. BRENEMAN.

Witnesses:
S. H. NOURSE,
JESSIE C. BRODIE.